United States Patent [19]

Briggs

[11] 4,292,363
[45] Sep. 29, 1981

[54] REINFORCED FOAM LAMINATES AND A PROCESS FOR THEIR MANUFACTURE

[75] Inventor: Peter J. Briggs, Cheadle Hulme, England

[73] Assignee: Imperial Chemical Industries Limited, London, England

[21] Appl. No.: 139,676

[22] Filed: Apr. 14, 1980

[30] Foreign Application Priority Data

May 31, 1979 [GB] United Kingdom ............... 18922/79

[51] Int. Cl.$^3$ .......................... B32B 5/02; B32B 5/20; B32B 5/28; B29D 7/04
[52] U.S. Cl. .................................. 428/247; 264/45.3; 428/110; 428/255; 428/310; 428/313; 521/902
[58] Field of Search ............... 428/310, 313, 315, 317, 428/247, 255, 105, 109, 110; 264/45.3; 521/902

[56] References Cited

U.S. PATENT DOCUMENTS

| | | | |
|---|---|---|---|
| 3,172,072 | 3/1965 | Willy | 428/310 |
| 3,554,851 | 1/1971 | Modigliani | 428/317 |
| 3,617,594 | 11/1971 | Willy | 428/317 |
| 3,867,494 | 2/1975 | Rood et al. | 428/315 |
| 3,874,980 | 4/1975 | Richards et al. | 428/313 |
| 3,960,999 | 6/1976 | Massie | 428/313 |
| 4,025,687 | 5/1977 | Wooler et al. | 428/310 |
| 4,028,158 | 6/1977 | Hipchen et al. | 428/313 |
| 4,118,533 | 10/1978 | Hipchen et al. | 428/313 |
| 4,163,824 | 8/1979 | Saidla | 428/313 |

FOREIGN PATENT DOCUMENTS

| | | |
|---|---|---|
| 1291126 | 3/1969 | Fed. Rep. of Germany . |
| 1435133 | 3/1966 | France . |
| 2021019 | 7/1970 | France . |
| 2241400 | 3/1975 | France . |
| 2287334 | 5/1976 | France . |
| 2371287 | 6/1978 | France . |
| 1073932 | 6/1967 | United Kingdom . |
| 1416283 | 12/1975 | United Kingdom . |
| 1418753 | 12/1975 | United Kingdom . |

*Primary Examiner*—William J. Van Balen
*Attorney, Agent, or Firm*—Cushman, Darby & Cushman

[57] ABSTRACT

The laminates have a core of rigid isocyanurate-based foam sandwiched between two facing sheets which are preferably non-combustible. Embedded in the core, substantially throughout its thickness, are multiple layers of a mesh of continuous glass fibre strands which is readily permeable to the foam forming ingredients. Each layer of the mesh is substantially parallel to the facing sheets.

The laminates show advantages over laminates reinforced with single filament surface veil mat, single filament expanded mat, single filament random swirl mat and continuous rovings.

10 Claims, 1 Drawing Figure

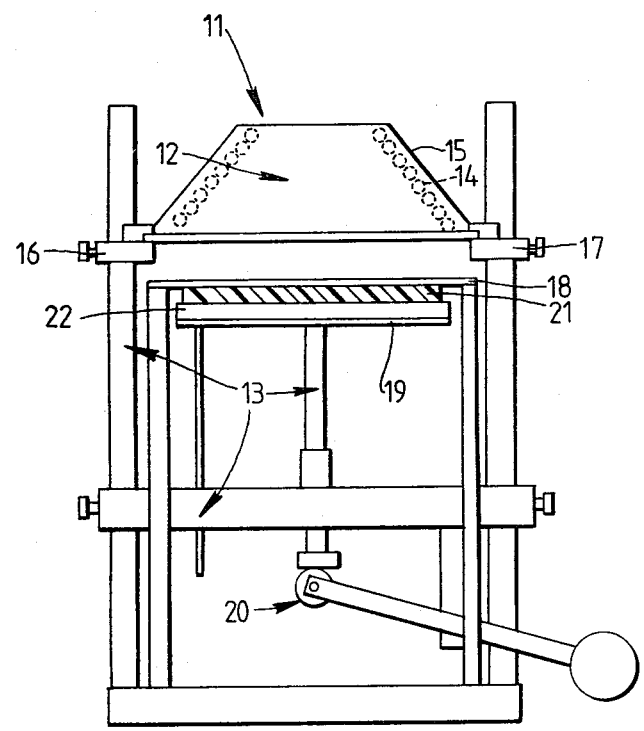

REINFORCED FOAM LAMINATES AND A PROCESS FOR THEIR MANUFACTURE

This invention relates to polyisocyanurate rigid foam laminates reinforced with glass fibre.

Laminated rigid plastics foam panels are widely used in the building and construction industry as sound and thermal insulating materials and as non-load bearing structural members. Because it is important that building materials do not readily burn and propogate fire through a building emphasis is placed on the fire resistance properties of these laminates and much research and development work has been done to improve these properties especially on isocyanate-based foams.

It is already known that isocyanurate based foams have excellent high temperature and fire resistant properties in comparison with other isocyanate-based foams, but under certain conditions it has been observed that whilst the foam itself is extremely resistant to burning, deep cracks often develop through which flames can penetrate and heat is conducted, thus leading to premature failure of the foam panel.

In our British Pat. No. 1,470,066 we describe polyisocyanurate rigid foam laminates having embedded in the foam core a binding material which is permeable to isocyanurate foam-forming ingredients and which is capable of improving the coherence of the foam on exposure to fire. Amongst suitable binding materials mentioned are glass and certain plastics fibres, strands, filaments, strips or extrusions in single random, woven or meshed form. The binding material is embedded preferably not deeper than approximately 2.5 cm from one or both outer surfaces of the foam core and it is further preferred that it is embedded in one or both outer surfaces of the foam core such that it touches one or both inner surfaces of two facing sheets. We have now found that a particular type of fibre glass embedded in the foam core in a particular way gives unexpected advantages.

According to the present invention we provide a laminated panel comprising a core of rigid isocyanurate-based foam sandwiched between two facing sheets characterised in that a mesh of continuous glass fibre strands readily permeable to the foam forming ingredients is embedded in multiple layers substantially throughout the thickness of the foam core with each layer being substantially parallel to the facing sheets, the whole being bonded together by the foam core into a unitary construction.

BRIEF DESCRIPTION OF THE FIGURE

The FIGURE shows an apparatus testing the fire resistance of a foam laminate.

Rigid isocyanurate based foams to which the invention relates are rigid polymeric foams characterised by the presence therein of an isocyanurate ring structure. The formulation of such foams is well known to the skilled worker in this field and the foams have been fully described in the relevant literature. They are conventionally made by reacting, in the presence of a blowing agent and a catalyst capable of polymerising isocyanate groups to isocyanurate structures, an excess of an organic polyisocyanate with a polymeric polyol. Additives such as surfactants plasticisers, stabilisers, fillers and pigments may also be included in the foam ingredients. Proportions of polyurethane and polyurea foams may also be present.

The facing sheets may be of any material capable of adhering to the isocyanurate based foam. Suitable materials include rubber, metal, asbestos, plasterboard, fibre glass, wood, paper, cardboard and plastics materials, for example, polyvinyl chloride, acrylonitrile/butadiene/styrene copolymer or polyester/fibre glass mixtures. The fire resistance of the laminate as a whole will however be further improved if non-combustible flexible or rigid facing sheets are used, for example, sheet metal, metal foil, asbestos, asbestos cement or plaster board. The outer surface of the facing sheets can be smooth or embossed or indented to provide functional or decorative effects.

The mesh of continuous glass fibre strands embedded in multiple layers in the foam core is obtained by using multi-layered, continuous strand mat which is a well known, well defined type of fibre glass. It may be uniformly or randomly oriented provided that it is readily permeable to the foam-forming ingredients and that the layers of the mesh are expanded by the rising foam. It is distinguished from (a) single filament surface-veil mat which is described in U.S. Pat. No. 2,609,320 and used in unexpanded form and with reduced fibre binder in British Pat. No. 1,536,979, from (b) single filament expanded mat described in British Pat. No. 1,073,932, from (c) single filament random swirl mat and from (d) continuous rovings described and used in British Pat. No. 1,416,283.

Glass fibre strands are composed of usually 20 to 2000 glass filaments each coated with a 'size' which is applied as an aqueous emulsion to the filaments before they are brought together in strands. The size usually contains a silane e.g. $\gamma$-aminopropyltriethoxysilane, N-Bis($\beta$-hydroxyethyl)-$\gamma$-aminopropyl triethoxysilane, $\gamma$-glycidoxypropyltrimethoxysilane, or $\gamma$-methacryloxypropyltrimethoxy silane, a lubricant, and a film-former, e.g. a catalysed unsaturated fumaric polyester. Other typically water emulsifiable polymers may be used as sizes, including polyethers, e.g. oxypropylated or oxyethylated glycols, polyvinyl acetate, epoxy resins, polyester resins, acrylates, polyurethanes. Sizes are deposited on to the glass surface usually in the amount of 0.5–1.0% w/w.

In the laminates of our invention the strands are substantially non-filamentised, that is they have not separated to any appreciable extent into their component filaments. The types of glass fibre designated (a), (b) and (c) are all in filamentary form.

Continuous rovings, designated (d), are a collection of strands coated with a proprietory size and wound parallel without induced twisting into a spool of glass fibre. Swirl mat prepared by 'fluffing-up' with air heaps of looped rovings tends to give a high density product inadequately permeable to low density foams and is distinguished from the continuous strand mats used in the present invention.

Strands composed of 50 to 200 filaments of diameter 5 to 30 microns, preferably 13 to 17 microns, have been found particularly useful. In Europe strands are normally classified by their 'Tex' number or 'strand count'; this is the number of grammes weight in a kilometre length of strand. Mats composed of strands of 10 to 50 Tex, especially 20 to 40 Tex, are preferred.

The glass normally used to make these strands is known as "E"-glass (electrical grade) which is characterised by its high mechanical strength.

The mutli-layered continuous strand mesh used in the invention is conveniently produced from layers of strands which are deposited on a conveyor and sprayed with a binder, which gives the mesh integrity during subsequent processing. A variety of types of binder may be used, e.g. thermoset unsaturated polyesters containing benzoyl peroxide catalyst, or thermoplastic types based on bisphenol-A derivatives, or urea/formaldehyde resins. Binders may be applied to the layers of continuous strands as a powder or aqueous solution or emulsion. Binder concentrations are preferably low, i.e. less than 10%, and more preferably 2% by weight or less, so that the layers of continuous strands can be readily expanded by the foam in producing the reinforced foam laminates. It is necessary only that sufficient binder is used to preserve the integrity of the mesh while winding it onto and unwinding it from a roll.

It is advantageous to stretch the mesh laterally, up to 30%, before contacting the mesh with the foam-forming ingredients; this stretching breaks some bonds and allows more efficient expansion of the mesh throughout the foam core.

Multi-layered continuous strand meshes for use with the low density foams of most interest to us are ideally 50 to 350 g/m$^2$ in weight and preferably 75 to 150 g/m$^2$. Typically they are in type like "UNIFILO" U-814 continuous strand mat (obtainable from Batzaratti Modigliani S.p.A. (Vetrotex, Saint-Gobain), Divisione Tassili, 20146 Milano, Via Romagnoli 6), except that their weight is within the above mentioned range. ("UNIFILO" is a Registered Trade Mark).

Permeability of the mat will depend inter alia on the interstitial area. 25 Tex Strand Mat of 120 g/m$^2$ weight has been estimated to have a mean interstitial area of 4 mm$^2$ and 25 Tex strand mat of 150 g/m$^2$ weight, 2 mm$^2$. These particular mats have been found very satisfactory. By comparison, single filament veil mat of 40 g/m$^2$ weight, when used in multiple layers to give an equivalent glass weight per unit area, has been estimated to have an interstitial area of 1.5 mm$^2$ and to be insufficiently permeable.

The laminates of the invention may be manufactured in any known equipment used for the production of conventional foam laminates, which may be a "horizontal" or "vertical" batch mould, jig or press, or a continuous laminating machine.

This according to a further aspect of our invention we provide a process for the manufacture of a laminated panel of the type consisting of a core of rigid isocyanurate-based foam sandwiched between two facing sheets, the process comprising contacting an expansible multi-layered mesh of continuous glass fibre strands with an isocyanurate-based rigid foam forming mixture, the mesh being readily permeable to the foam forming ingredients, and allowing the foam to rise and cure between two facing sheets, the panel being formed within a mould or between mould surfaces.

In a "horizontal" batch process, where the faces of the laminate to be produced lie in a horizontal plane, a first facing sheet is laid in the bottom of the mould and on top of it is placed the continuous strand mesh which may if desired, be adhered or taped to the facing sheet. A measured quantity of foam mix is poured or sprayed into the mould and a second facing sheet is either floated on top of the foam mix or supported in a horizontal frame at the top of the mould and the mould then closed. The quantity of foam mix used is sufficient to give some degree of "overpacking" when fully cured, that is to say that if the foam were allowed to rise freely it would achieve a thickness marginally greater than it does with the mould closed. This overpacking reduces the formation of voids between the second facing sheet and the foam core and hence improves adhesion. The sides of the mould are coated with a release agent to facilitate removal of the laminate from the mould. Alternatively edging members, which become part of the finished laminate, may be inserted in the mould before the foam is introduced. These members may be constructed of materials hereinbefore exemplified for the facing sheets and may be of special design, for example, they can be arranged to mate with supporting frames and to provide overlapping or tongue and groove effects.

In a "vertical" batch process it is most convenient to insert in a jig two facing sheets, spaced apart on three sides by edging members, the fourth side presenting an opening at the top of the mould; the binding material being adhered or taped to one of the facing sheets. The foam mix may be introduced into the mould by any of a number of well known filling techniques, for example by direct pour or by using a reciprocating injection head.

The laminates of the invention may be produced continuously on any conventional continuous laminating machine, for example, the horizontal laminating machine made by Viking Engineering Limited, Stockport, Cheshire, described in an article entitled "A New Development Machine for the Continuous Lamination of Rigid Urethane Foam" published in "Rubber and Plastics Age", Vol. 47 (1966), No. 1 page 57. Where rigid faced laminates are to be made, machines adapted to accommodate rigid discontinuous facing sheets and edging members will be used. Examples of these are described in British specification Nos. 1,098,147; 1,164,305 and 1,245,881.

It will be understood that when a continuous laminator is used, mould surfaces are provided usually in the form of two spaced opposed parallel conveyors backed by platens which exert pressure, sometimes a constant predetermined pressure, to finally form a parallel faced laminate of desired thickness.

Advantageously the invention provides fibre reinforced foam laminates of good foam integrity with good adhesion between the foam core and facing sheets and improved fire resistance properties. The laminates also show improved mechanical strength and better dimensional stability which, on exposure to fire, can prevent physically weak non-combustible facings, like asbestos and aluminium foil, becoming torn or can, at least, minimise such tearing and prevent the formation of large rents in the facings.

In the Examples which follow, a type of glass fibre—labelled A in Table 1—which may be used in the present invention is compared with other types of glass fibre which are not suitable: these are labelled B, C, D and E. While the laminates and processes exemplified using glass fibre type A re illustrative of the present invention, it will be understood that the laminates and processes employing glass fibre types B, C, D and E form no part of it and are described for comparative purposes only. The same applies to the 'control' experiments in which no fibre glass is used.

TABLE 1

| | Type of Glass fibre | Weight/Area | Size | Binder |
|---|---|---|---|---|
| (A) | Continuous Strand Mesh prepared from 25 Tex strands | 120 g/m$^2$ | Unsaturated polyester | Unsaturated polyester (2% w/w) |
| (B) | Single Filament Surface-Veil Mat | 40 g/m$^2$ (3 webs) | | Unsaturated polyester (4% w/w) |
| (C) | Single Filament Expanded Mat | 120 g/m$^2$ | | Urea/Formaldehyde (15% w/w) |
| (D) | Continuous Rovings 10 Tex, 2800 filaments | 120 g/m$^2$ | Silane | |
| (E) | Single Filament Random Swirl Mat | 120 g/m$^2$ | Silane | Unsaturated polyester (3% w/w) |

EXAMPLE 1

A polyisocyanurate rigid foam laminate was produced on a "horizontal" laminator made by Viking Engineering Limited, Stockport, Cheshire and described in an article entitled "A New Development Machine for the Continuous Lamination of Rigid Urethane Foam" published in "Rubber and Plastics Age", Vol. 47 (1966) No. 1 page 57, using a high pressure impingement mixing-gun fitted with a spray-type nozzle and mounted on a traversing device. Polythene-coated Kraft paper was used as the facings. The foam-forming ingredients, Part A and Part B, formulated as described below are separately fed to the mixing gun.

| | Parts by weight |
|---|---|
| Part A: | |
| Oxypropylated tolylene diamine (OHV=310) | 20.4 |
| An ethylene oxide/propylene oxide adduct | 4.0 |
| A catalyst composed of ethylene glycol (20 p.b.w.), potassium acetate (20 p.b.w.) and water (1.5 p.b.w.) | 1.5 |
| Silicone L5420 (ex Union Carbide) | 1.0 |
| Arcton 11 | 28 |
| Part B: | |
| Polymeric MDI (with isocyanate strength of 91.5%) | 100 |

This foam system had the following reactivity:
Cream time: 10 secs.
End of Rise: 60 secs.
Tack free time: 70 secs.

Four lots of different types of glass fibre A, B, E and D (see Table 1) were taped to the lower paper facing one after the other. These were all the same weight/unit area (viz. 120 g/m$^2$); and the same length and width, viz. 2 meter long by 1 meter wide. These were then passed on the carrier paper-facing underneath the traversing foam spray-head. The liquid foam chemicals wetted out the glass fibre to different extents depending on the permeability of the glass fibre layers. The foam then expanded and again opened-up the glass fibre layers to different extents. Excellent permeability and expansion characteristics were shown by the continuous strand mesh (A). The permeability of the other glass fibre types was not sufficiently good to allow complete penetration by the foam with the result that lower adhesive strengths were obtained on the top facing. Results are shown in Table 2.

TABLE 2

| Glass fibre type | Initial thickness of glass fibre (mm) | Thickness of fibre in foam (mm) | Permeability to foam | Peel Strength to Top Paper Facing (kg/cm) | Density of Foam (kg/m$^3$) |
|---|---|---|---|---|---|
| A | 2 | 50 | Excellent. Uniform foam surface. | 0.35 | 34.8 |
| B | 1 | 40 | Incomplete wetting of fibre. Undulations over whole of foam surface. | 0.04 | 36.0 |
| E | 4 | 45 | Incomplete wetting of fibre. Some undulations on foam surface. | 0.25 | 31.4 |
| D | 5 | 45 | Good wetting of fibre but much undulation on foam surface. | 0.32 | 34.8 |
| CONTROL without glass fibre | — | — | — | 0.22 | 31.8 |

The fire resistance of samples of the laminates was tested by subjecting the samples to thermal radiation having an intensity of 4 KW/cm$^2$ radiant flux by the method and in the apparatus hereinafter described with reference to the accompanying diagrammatic drawing.

In the FIGURE, test apparatus 11 consists of a radiator 12 and specimen holder 13. The radiator 12 has a stainless steel heating tube 14 which is bent in a truncated cone shape and fixed together by NiCr-wire. The tube 14 is covered by a shade 15 consisting of two shells of heat resistant steel with an insulating ceramic fibre blanket interposed therebetween. The heating tube 14 is fastened to the shade 15 by NiCr-wires. Two clamps 16 and 17 serve to fix the radiator above the specimen holder 13 which is of stainless tubular steel construction. A mask 18 supported by the specimen holder has a circular opening (not shown) of 150 mm diameter. A press plate 19, covered with asbestos millboard 22, and counterweighted through a leverage system 20, holds a sample of foam laminate 21 against the mask 18.

Samples were held in the test apparatus, with their lower faces nearest the radiator, some for 1 minute and some for 4 minutes. After cooling, the samples were assessed for:

(i) depth of charring; and
(ii) cracking of the char formed.

The "lower" face is a reference to the face on which the glass fibre is laid and the foam mix deposited in the lamination process. The lower face was placed nearest the radiator to eliminate possible unfair comparison introduced by the unevenness of the upper surface of some samples.

The test method using this "ISO Radiant Cone" is based on an "Ignitability Test for Building Materials" by P.Topf of the Institut Fur Holzforschung, University of Munich. Results are shown in Table 3.

TABLE 3

| Type of Glass fibre | 1 MINUTE TEST | | 4 MINUTE TEST | |
|---|---|---|---|---|
| | (i) Char depth (mm) | (ii) Cracking | (i) Char depth (mm) | (ii) Cracking |
| A | 11 | Minor fissure. | 28 | 3 Cracks (10 mm deep) and minor fissures. |
| B | 16 | 7 Minor fissures | 32 | 3 Cracks (10 mm deep) and minor fissures. |
| E | 14 | 2 Cracks (10 mm deep) and 3 minor fissures. | | |
| D | 15 | 4 minor fissures. | | |
| CONTROL without glass fibre | 20 | Large cracks 12 mm deep 8 mm wide. | 40 | Severe cracking 40 mm deep 12-30 mm wide. |

Throughout the Examples we use the expression "fissure" to describe surface cracking or crazing.

EXAMPLE 2

A polyisocyanurate rigid foam laminate was produced as in Example 1 except that the ingredients Parts A and B had the following composition:

| | parts by weight |
|---|---|
| Part A: | |
| Oxypropylated Sucrose/triethanolamine (OHV=496 mg KOH/g) | 19.8 |
| Silicone L5320 (Union Carbide) | 1.0 |
| A catalyst composed of ethylene glycol (20 p.b.w.), potassium acetate (20 p.b.w.) and water (1.5 p.b.w.) | 1.5 |
| NN-dimethylcyclohexylamine | 0.4 |
| Trichloropropyl phosphate | 18.4 |
| Arcton 11 | 19.7 |
| Part B: | |
| Polymeric MDI (with isocyanate strength of 90.0%) | 100 |

This foam system had the following reactivity:
Cream time: 14 secs.
End of Rise: 80 secs.
Tack free time: 70 secs.

Density of unreinforced foam: 41 kg/m$^3$.

Three lots of different types of glass fibre A, B and C were taped to the lower paper facing: all were of the same weight/unit area, viz. 120 g/m$^2$. The foam was sprayed onto these lots of glass fibre as they passed underneath the traversing mixing-head. Results are given in Tables 4 and 5.

TABLE 4

| Glass fibre type | Initial Thickness of Glass Fibre (mm) | Thickness of fibre in foam (mm) | Permeability to foam | Adhesion to top paper |
|---|---|---|---|---|
| A | 2 | 35 | Very good. Slight undulation on top foam surface. | Moderate |
| B | 1 | 30 | Incomplete wetting of fibre. Undulations over whole of foam surface (top and bottom). | Poor |
| C | 12 | 30 | Incomplete wetting of fibre. Undulations over both top and bottom foam surfaces. | Poor |

TABLE 5

"ISO Radiant Cone" test on lower faces of laminates at 4 kW/cm$^2$

| Type of Glass fibre (mm) | 1 MINUTE TEST | |
|---|---|---|
| | Char depth | Cracking |
| A | 8 | None |
| B | 8 | None |
| CONTROL without glass fibre | 9 | None |

EXAMPLE 3

A polyisocyanurate rigid foam laminate was produced as in Example 1 except that the ingredients Parts A and B had the following composition:

| | parts by weight |
|---|---|
| Part A: | |
| Oxypropylated tolylene diamine (OHV=310) | 20.4 |
| An ethylene oxide/propylene oxide-ethylene glycol adduct | 4.0 |
| A catalyst composed of ethylene glycol (20 p.b.w.), potassium acetate (20 p.b.w.) and water (1.5 p.b.w.) | 1.5 |
| Silicone L5420 | 1.0 |
| Arcton 11 | 28 |
| Part B: | |
| Polymeric MDI (with isocyanate strength of 89.7%) | 100 |

Two lengths of glass fibre web of type A and one length of type B were taped to the lower paper face. Samples of the laminate were each fitted in a softwood frame of internal dimensions 41×41×5 cm$^3$ and external dimensions 45×45×5 cm$^3$, which was faced with two sheets of 20 s.w.g. mild steel.

The relative fire resistance of the framed samples was measured under test conditions similar to those described in the British Standards Institution's "Fire Tests on Building Materials and Structures" (BS 476: Part 8 1972). Briefly one face of the laminate was exposed to a radiant gas furnace which could be accurately controlled to follow a standard temperature profile and the temperature of the cooler outer face was measured at five points—at the centre and at the centre of each quarter—at regular intervals. The laminate was judged to have failed in terms of heat conductance when either a single point reading had risen above 180° C. or the mean temperatures had risen through 140° C.

Results are shown in Table 6.

TABLE 6

| Type of glass fibre | Density of foam (kg/m³) | Heat Conductance Failure time (mins) | Appearance of Charred Panel after fire test |
|---|---|---|---|
| CONTROL (foam unreinforced) | 27.5 | 27 | Severe cracks measuring 20 to 50 mm deep and 20 mm wide. |
| A (unstretched) 150 g/m² | 31.8 | 32 | 2 cracks and fissures. The biggest crack was 19 cm long, 10 mm deep and 8 mm wide. |
| A (stretched laterally by approx. 30%) 150 g/m² | 31.4 | 32 | Many small fissures. |
| B | 28.2 | 31 | 4 cracks and fissures. The biggest crack was 28 cm long, 20 mm deep, and 10 mm wide. |

EXAMPLE 4

A polyisocyanurate foam laminate was produced as in Example 1 except that the ingredients Parts A and B had the composition given below and that the Viking horizontal laminator was modified to incorporate a high pressure impingement mixing-head dispensing from a static position and nip rollers through which the facings and sandwiched foam-forming mixture was passed at a speed of 10 m/min. The mixing-head was attached to a nozzle which was mounted 150 cm above the lower facing.

Foam-forming ingredients:

| | parts by weight |
|---|---|
| Part A | |
| An activator whose composition is described below | 36.2 |
| A catalyst composed of ethylene glycol (20 p.b.w.), potassium acetate (20 p.b.w.) and water (1.5 p.b.w.) | 0.4 |
| Arcton 11 | 20 |
| Part B | |
| Polymeric MDI (isocyanate strength about 90%) | 100 |

The activator was composed of the following ingredients:

| | parts by weight |
|---|---|
| Polyester from adipic acid, phthalic anhydride, propylene glycol, glycerol (OHV=250) | 11.4 |
| A 50:50 mixture of oxypropylated tolylene diamine (OHV=480) and oxypropylated triethanolamine (OHV=525) | 9.0 |
| An ethylene oxide/propylene oxide adduct | 2.0 |
| Cirrasol EN-MP (ethylene oxide-oleyl cetyl alcohol adduct) | 2.0 |
| Trichloropropyl phosphate | 10.0 |
| Silicone L5340 | 0.8 |
| A catalyst composed of ethylene glycol (20 p.b.w.), potassium acetate (20 p.b.w.) and water (1.5 p.b.w.) | 1.0 |

This foam system had the following reactivity:
Cream Time: 15 secs.
End of Rise: 62 secs.
Tack free time: 42 secs.

The laminate so produced was made with and without glass fibre mesh (type A, 150 g/m²) and subsequently subjected to the ISO Cone test. Results are given in Table 7.

TABLE 7

| | 1 MINUTE TEST | | 4 MINUTE TEST | |
|---|---|---|---|---|
| Type | Char depth (mm) | Cracking | Char depth (mm) | Cracking |
| CONTROL, unreinforced | 10 | 3 cracks (1–2 mm wide 4 mm deep). | 30 | Severe distortion. Cracks at edge, (8–12 mm wide 18 mm deep). |
| Glass fibre mat (type A) | 10 | No cracks or fissures. | 25 | Few minor fissures at edge. |

EXAMPLE 5

A polyisocyanurate foam laminate was produced as in Example 1 except that the facings used were bitumen (20%) impregnated asbestos felt (640 gm/m²). Results are given in Table 8.

TABLE 8

| Type | Char depth (mm) | 4 MINUTE TEST Cracking |
|---|---|---|
| CONTROL, without glass reinforcement | 40 | Facing split in two: rent 20 mm wide. Crack under facing at edge 5 mm wide, 8 mm deep. Facing had 80 mm long crack of negligible width and still intact. Crack under facing 3 mm wide, 5 mm deep. |
| A | 25 | |
| B | 30 | Facing cracked but still intact. Crack 35 mm long; 15 mm deep; 3 mm wide. |

Discussion of Results

The results show that polyisocyanurate foam laminates reinforced with continuous strand fibre glass mesh when compared with laminates reinforced by an equivalent weight of single filament surface veil mat, single filament expanded mat, continuous rovings and single filament random swirl mat have superior properties in respect of (a) integrity of the foam core and adhesion to the facing material owing to the better permeability of the glass mesh, and (b) fire resistance in terms of depth of charring, cracking and heat conductance. The laminates of the invention also show superior properties over unreinforced laminates made with the same foam, in respect of (b) and better dimensional stability.

I claim:

1. A laminated panel comprising a core of rigid isocyanurate-based foam sandwiched between two facing sheets characterized in that a mesh of continuous glass fiber strands readily permeable to the foam forming ingredients is embedded in multiple layers substantially throughout the thickness of the foam core, the whole being bonded together by the foam core into a unitary construction.

2. A laminated panel as claimed in claim 1 in which the glass fibre strands are composed of 50 to 200 filaments of diameter 5 to 30 microns.

3. A laminated panel as claimed in claim 1 in which the glass fibre strands are composed of 50 to 200 filaments of diameter 13 to 17 microns.

4. A laminated panel as claimed in claim 1 in which the glass fibre strands which form the mesh are bound with less than 10% by weight of the binder.

5. A laminated panel as claimed in claim 1 in which the glass fibre strands which form the mesh are bound with less than 2% by weight or less of binder.

6. A laminated panel as claimed in claim 1 in which the mesh is 50 to 350 g/m$^2$ in weight.

7. A laminated panel as claimed in claim 1 in which the mesh is 75 to 150 g/m$^2$ in weight.

8. A laminated panel as claimed in claim 1 in which the mesh is 25 Tex Strand Mat of 120 g/m$^2$ weight.

9. A laminated panel as claimed in claim 1 in which the mesh is 25 Tex Strand Mat of 150 g/m$^2$ weight.

10. A process for the manufacture of a laminated panel of the type consisting of a core of rigid isocyanurate-based foam sandwiched between two facing sheets, the process comprising contacting an expansible multi-layered mesh of continuous glass fibre strands with an isocyanurate-based rigid foam forming mixture, the mesh being readily permeable to the foam forming ingredients, and allowing the foam to rise and cure between two facing sheets, the panel being formed within a mould or between mould surfaces.

* * * * *